United States Patent
Mitterreiter et al.

(10) Patent No.: US 7,707,730 B2
(45) Date of Patent: May 4, 2010

(54) BODY HAVING AN ANGLE SCALE AND ITS USE

(75) Inventors: Johann Mitterreiter, Chieming (DE); Jens Dormann, Trostberg (DE); Pascal Haible, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 87 days.

(21) Appl. No.: 12/175,781

(22) Filed: Jul. 18, 2008

(65) Prior Publication Data

US 2009/0025236 A1    Jan. 29, 2009

(30) Foreign Application Priority Data

Jul. 23, 2007    (DE) .................. 10 2007 034 640

(51) Int. Cl.
*G01B 21/22* (2006.01)
*B23Q 17/00* (2006.01)
(52) U.S. Cl. .................................... 33/1 PT; 33/706
(58) Field of Classification Search ............... 33/1 PT, 33/1 N, 706, 707, 708; 324/207.22; 340/67.1; 356/616; 250/231.13
See application file for complete search history.

(56) References Cited

U.S. PATENT DOCUMENTS

| | | | |
|---|---|---|---|
| 4,257,040 A | | 3/1981 | Shirasaki et al. |
| 5,166,611 A | * | 11/1992 | Kujawa et al. ............... 324/166 |
| 5,200,698 A | * | 4/1993 | Thibaud ................. 324/207.22 |
| 7,032,317 B2 | * | 4/2006 | Hertenberger et al. ........ 33/1 N |
| 7,290,344 B2 | * | 11/2007 | Brandl et al. ................ 33/1 PT |
| 2004/0211072 A1 | * | 10/2004 | Hertenberger et al. ...... 33/1 PT |
| 2006/0110885 A1 | | 5/2006 | Brandl et al. |
| 2006/0208173 A1 | * | 9/2006 | Nakamura et al. ..... 250/231.13 |
| 2007/0216400 A1 | * | 9/2007 | Kayao ................... 324/207.22 |

FOREIGN PATENT DOCUMENTS

| | | | |
|---|---|---|---|
| EP | 1 666 848 | | 6/2006 |
| JP | 2002039791 A | * | 2/2002 |
| JP | 2009023086 A | * | 2/2009 |

OTHER PUBLICATIONS

Search Report, European Application No. EP 08 00 7801, dated Nov. 18, 2008 (translated).

* cited by examiner

*Primary Examiner*—R. Alexander Smith
(74) *Attorney, Agent, or Firm*—Kenyon & Kenyon LLP

(57) ABSTRACT

An annular body has an angle scale for measuring the rotational position of a machine part about an axis, the body having recesses and projections on its inner circumference, and at least one of the recesses being suited for a form-locking rotatably fixed attachment on the machine part. The sum of the central angles, which are respectively defined by starting points and end points of the projections is smaller than the sum of the central angles, which are respectively defined by the starting points and end points of the recesses. Such a body on a high-speed shaft of a machine tool may be used for measuring the rotational position of the shaft.

15 Claims, 3 Drawing Sheets

BODY HAVING AN ANGLE SCALE AND ITS USE

CROSS-REFERENCE TO RELATED APPLICATIONS

The present application claims priority to Application No. 10 2007 034 640.0, filed in the Federal Republic of Germany on Jul. 23, 2007, which is expressly incorporated herein in its entirety by reference thereto.

FIELD OF THE INVENTION

The present invention relates to a body having an angle scale, as may be used particularly in angle-measurement systems. In addition, the present invention relates to the use of the body having an angle scale for measuring the rotational position of a high-speed shaft of a machine tool.

BACKGROUND INFORMATION

Angle-measurement systems are used to measure rotary motions or rotational positions of a machine part such as a shaft, for example, on which a body having an angle scale is fixated in a rotatably fixed manner. The angle scale may have, for example, an optical or a magnetic graduation which may be scanned accordingly. The rotary motion is measured either incrementally or absolutely, the output measured value being, for example, a sequence of counting pulses, a counter value or a code word. Corresponding angle-measurement systems are used particularly in machine tools on high-speed spindles. Such spindles are increasingly operated at high rotational speeds, for example, up to more than 40,000 revolutions per minute, in order to obtain workpiece surfaces of high quality, e.g., by using cutting machine tools. The mechanical stress on rotating parts that are mounted on such a spindle is accordingly high. In particular, the normally annular bodies having an angle scale, particularly having a magnetic graduation, are connected to the spindles in a rotatably fixed manner such that they are exposed to enormous centrifugal forces. It is a permanent objective to construct bodies having an angle scale that withstand the stresses due to high rotational speeds and which particularly have the required fatigue strength under these stresses. Importantly, these requirements also result from safety-related considerations.

U.S. Pat. No. 4,257,040, for example, describes a body having an angle scale that is attachable in a form-locking manner as a rotating element on a shaft.

Such an arrangement of a rotating body having an angle scale has the disadvantage, however, that its permissible maximum rotational speed is not sufficiently high for high rotational speeds as occur in high-speed machine parts, in particular shafts, or that its fatigue strength is insufficient.

SUMMARY

Example embodiments of the present invention provide a body having an angle scale for measuring the rotational position of a machine part, which is, in particular, characterized in that it is suitable for extremely high maximum rotational speeds.

Example embodiments of the present invention provide for measuring the rotational position of a high-speed shaft of a machine tool.

The annular body having an angle scale, according to example embodiments the present invention, is suitable for measuring the rotational position of a machine part about an axis. The body has radial recesses and projections on its inner circumference. At least one of the recesses is suitable for a form-locking rotatably fixed attachment on the machine part. Furthermore, the sum of the central angles, which are respectively defined by starting points and end points of the projections, is smaller than the sum of the central angles, which are respectively defined by the starting points and end points of the recesses.

In the following, a central angle should be understood, in particular, as a center point angle about a point on the axis within the annular body.

Considerably higher permissible rotational speeds may be achieved with the bodies having an angle scale as described herein and that the annular bodies have the required fatigue strengths at correspondingly high rotational speeds.

In particular, the annular body having an angle scale may be arranged such that the sum of the central angles, which are respectively defined by starting points and end points of the recesses, is greater than 220°, e.g., greater than 240°, e.g., greater than 270° or 300°.

The at least one recess for the form-locking rotatably fixed attachment on the machine part may have a geometry having the smallest contour radius Ry. An additional recess has a smallest contour radius Rx such that the condition Ry<Rx is satisfied. The additional recess is frequently not used for transmitting a torque from the machine part to the body, but is by construction provided only for increasing the permissible rotational speed or for increasing the fatigue strength.

If the respective recess for the form-locking rotatably fixed attachment on the machine part has multiple contour radii, particularly the smallest contour radius Ry is relevant in this regard. It may also be the case, however, that the recess for the form-locking rotatably fixed attachment on the machine part only has one contour radius Ry, for example, if the respective recess has a semicircular shape for receiving a pin that has a round cross section. In this case, the (sole) contour radius Ry is decisive.

The annular body having an angle scale may be constructed such that the smallest distance between the bottom of the recess for the form-locking rotatably fixed attachment on the machine part of the body and the axis is smaller than or equal to the smallest distance between the bottom of the additional recess and the axis. The smallest distance should be understood as the shortest distance from the axis such that the path from the axis to the point whose distance is to be determined is oriented orthogonally with respect to the axis. The bottom of the additional recess is the respective geometric region that is furthest removed from the axis within the recess.

In a further arrangement of the geometry of the annular body, the ratio of the outer radius of the body to its inner radius is smaller than 2, e.g., smaller than 2.25 or 1.75. In such slim annular bodies, the material stress is, in general, particularly high.

The annular body may be arranged such that its angle scale is situated on the lateral side of the body. Alternatively, however, example embodiments of the present invention also includes bodies on the end face of which an angle scale is situated, for example, having radially oriented scale or graduation structures.

The body may be constructed monolithically, e.g., such that a body thus described is made of one piece such that it may be manufactured, for example, by a cutting process, for example, from a steel material. The monolithic construction has a positive effect on the permissible maximum rotational speed.

The angle scale may be attached as a separate ring on the annular body or may be applied directly on the body. For example, the angle scale may include magnetic regions that are produced directly by a suitable magnetization of the body.

A direct application of an angle scale on the annular body may also be performed using a laser ablation process, for example. To this end, the outer lateral side of the body is coated with a special layer and an individual graduation ablation is performed. Consequently, the angle scale may be scanned using an optical principle. An angle scale may also be applied directly on the body by a lithography method, an embossing method, etc.

Alternatively, the angle scale may be fastened as a separate ring on the annular body, particularly if a special magnetic material is used for this ring in which a magnetic graduation structure of great field strengths is produced.

The recess for a form-locking rotatably fixed attachment of the body on the machine part may be arranged as an feather key groove, for example, for a Woodruff key, insertion feather key, sliding spring, etc. Alternatively, the form-locking rotatably fixed attachment of the body on the machine part may be produced by a multi-groove profile or a pin connection.

Another aspect of example embodiments of the present invention provides for the use of an appropriately arranged annular body having an angle scale on a high-speed shaft of a machine tool for measuring the rotational position of the shaft. A high-speed shaft should be understood as a shaft that is able to rotate in operation at a speed of at least 10,000, e.g., at least 20,000, or, e.g., at least 30,000 revolutions per minute. In this connection, the machine tool may be a cutting machine, since such machine tools frequently exhibit extremely high maximum rotational speeds of the spindle. Accordingly, the shaft, on which the annular body is fastened, may be connected to a cutting tool.

Further features and aspects of example embodiments of the present invention are described in more detail below with reference to the appended Figures.

BRIEF DESCRIPTION OF THE DRAWINGS

FIG. 2b is a top view of the body having the angle scale illustrated in FIG. 2a.

DETAILED DESCRIPTION

Figure 1:
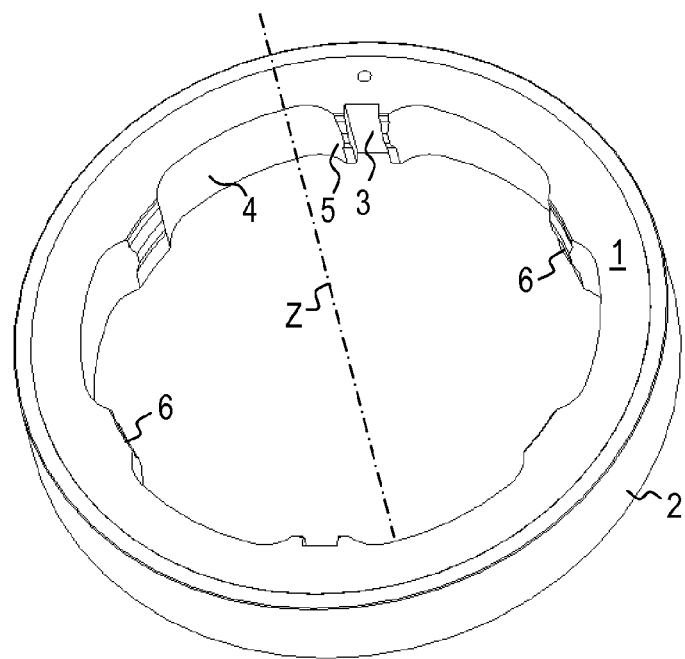
FIG. 1 is a perspective view of a body having an angle scale according to an example embodiment of the present invention.
Figure 2A:
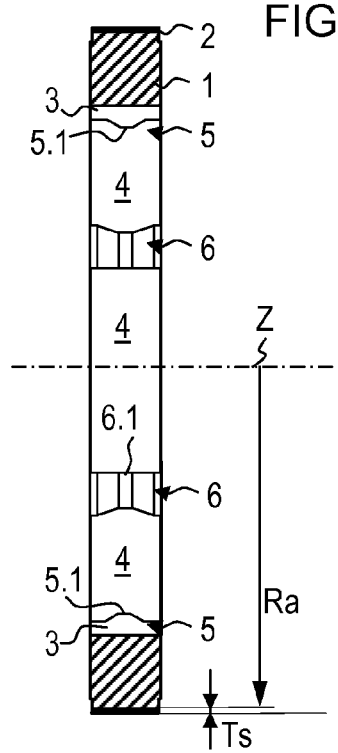
FIG. 2a is a cross-sectional view in the radial direction through the body having the angle scale.
Figure 2B:
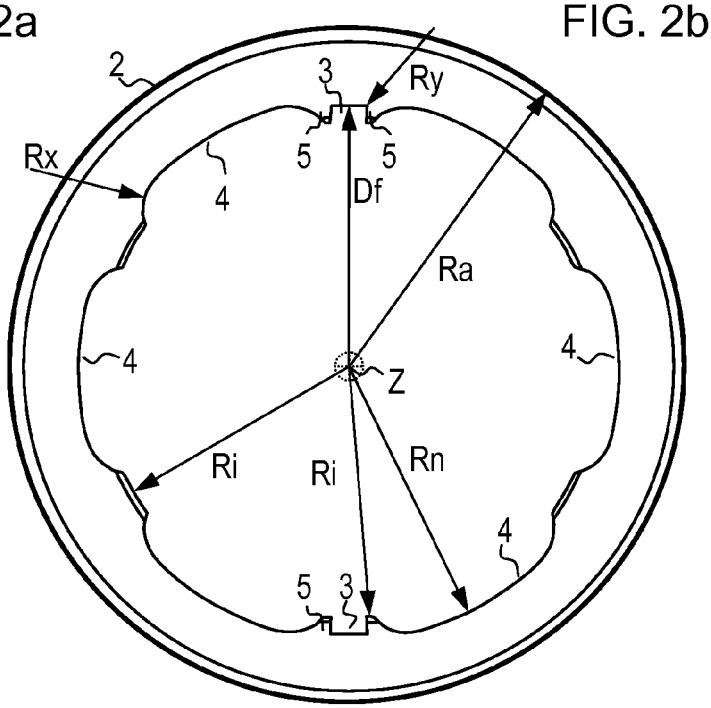

According to FIGS. 1 to 5, the body 1, 1' includes in its inner circumference two recesses for the form-locking rotatably fixed attachment on a machine part, in this case on a shaft 8. In particular, these recesses take the form of feather key grooves 3 as per DIN 6885, into which a feather key 7 may be installed. Annular body 1, 1' or shaft 8 are rotatable about a central axis Z. To measure the rotational position of a shaft 8 about an axis Z, annular body 1 is provided with a lateral-side angle scale 2. In the present examples, angle scale 2 has a magnetic graduation, in particular a separate ferromagnetic ring having alternately magnetized regions across its circumference being used in this context. The ferromagnetic ring is formed, for example, of an alloy having the components iron, chromium, cobalt and molybdenum, while body 1 is formed of a high-tensile bearing steel. In this instance, the ferromagnetic ring is fastened to body 1, 1' on the lateral side by a soldered joint.

Body 1, 1' itself has an outer diameter of approximately, e.g., 73.8 mm (Ra=36.9 mm), the ferromagnetic ring additionally having a thickness Ts of, e.g., 0.8 mm.

Angle scale 2 is arranged such that a rotational position about an axis Z of body 1, 1' is detectable, e.g., that the magnetic markings of angle scale 2 exhibit an offset in the circumferential or rotational direction when the annular body is rotated about axis Z. In the exemplary embodiment illustrated, angle scale 2 is arranged so as to allow it to be magnetically scanned by a magnetosensitive scanning head.

According to FIGS. 1 to 4, body 1 has additional recesses 4 on its inner circumference apart from feather key grooves 3. These are not used for fastening on shaft 8, but are rather provided only for reasons of increasing the permissible rotational speed or the continuous stress-bearing capacity of body 1. Between feather key grooves 3 and recesses 4, body 1 has projections 5 that embrace a centering flange 5.1 in the middle with reference to the axial extension of body 1. This centering flange 5.1 is machined with extreme precision and provides a contact surface to the shaft 8. Furthermore, projections 6 are provided on the inner circumference between the individual recesses. These projections 6 also have axially at the center a precisely machined centering flange 6.1. In the installed state, shaft 8 accordingly abuts on centering flanges 5.1, 6.1 along an interrupted circumferential line.

Figure 3:
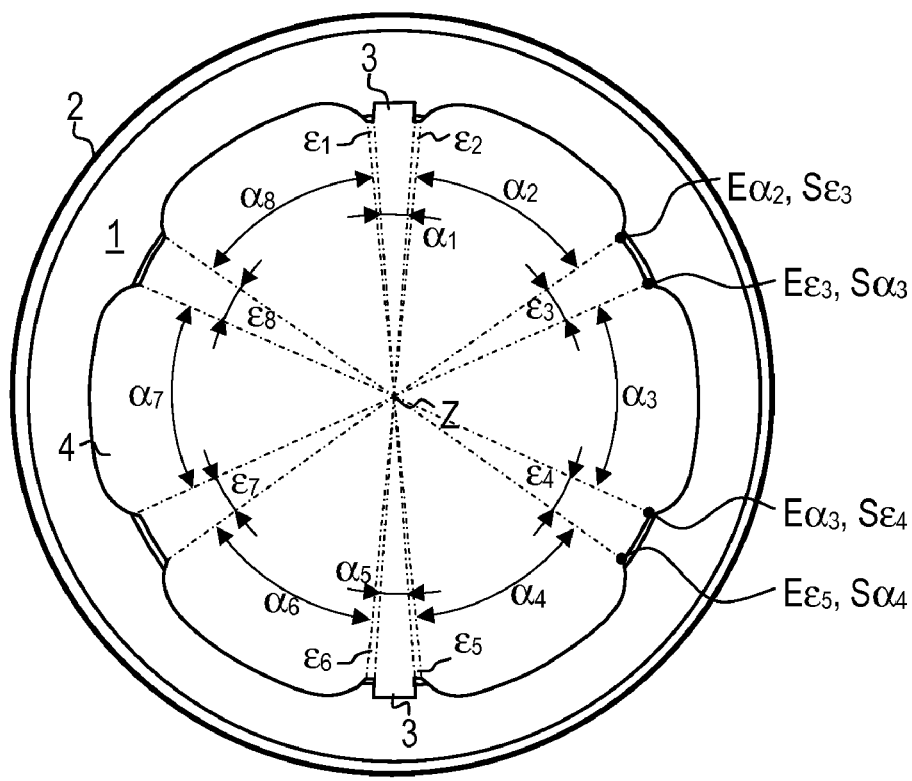
FIG. 3 is a top view of the body having the angle scale, as illustrated in FIGS. 2a and 2b, including specifications regarding the respective central angles.
Figure 4:
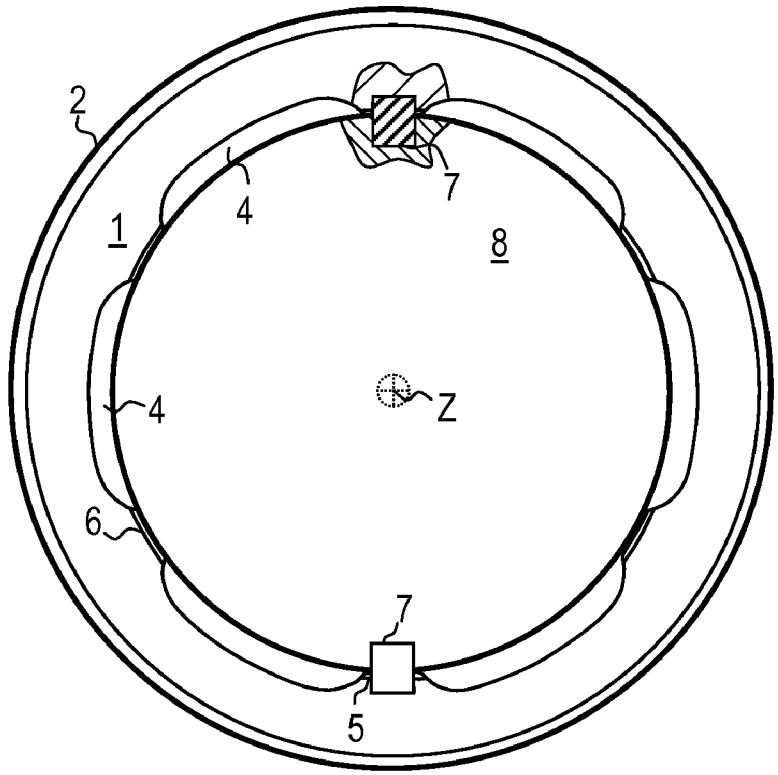
FIG. 4 is a top view of the body having the angle scale, as illustrated in FIGS. 2a, 2b, and 3, in the mounted state.

The relative distribution of projections 5, 6 in relation to feather key grooves 3 and recesses 4 is explained with reference to FIG. 3. Central angles $\alpha$, $\epsilon$ may be used for this consideration, which in the present case describe the angle between two straight lines pointing from axis Z radially toward the outside, which extend through defined starting points $S\alpha_1$ through $S\alpha_8$, $S\epsilon_1$ through $S\alpha_8$ or end points $E\alpha_1$ through $E\alpha_8$, $E\epsilon_1$ through $E\epsilon_8$ on the inner circumference of body 1. For reasons of clarity, not all starting points and end points $S\alpha_1$ through $S\alpha_8$, $S\epsilon_1$ through $S\epsilon_8$, $E\alpha_1$ through $E\alpha_8$, $E\epsilon_1$ through $E\epsilon_8$ are labeled in FIG. 3 such that FIG. 3 only indicates the starting points $S\epsilon_3$, $S\alpha_3$, $S\epsilon_4$ and $S\alpha_4$ and end points $E\alpha_2$, $E\epsilon_3$, $E\alpha_3$ and $E\epsilon_5$. In the exemplary embodiments illustrated, starting points $S\alpha_1$ through $S\alpha_8$, $S\epsilon_1$ through $S\epsilon_8$ always come to lie on end points $E\alpha_1$ through $E\alpha_8$, $E\epsilon_1$ through $E\epsilon_8$. End point $E\alpha_2$, for example, lies on starting point $S\epsilon_3$.

Two groups of central angles $\alpha$, $\epsilon$ are defined in the present exemplary embodiment. The first group includes central angles $\alpha_i$, which are respectively defined by starting points $S\alpha_i$ and end points $E\alpha_i$ on feather key grooves 3 or on recesses 4. The second group includes central angles $\epsilon_i$, which are respectively defined by starting points and end points $S\epsilon_i$, $E\epsilon_i$ of projections 5, 6. In particular, starting points $S\alpha_i$, $S\epsilon_i$ and end points $E\alpha_i$, $E\epsilon_i$ are at the same time those points where there is a transition with respect to shaft 8 abutting on and not abutting on body 1. Feather key grooves 3 or recesses 4 are thus located between starting points $S\alpha_i$ and end points $E\alpha_i$, while projections 5, 6 are located between starting points $S\epsilon_i$ and end points $E\epsilon_i$. As already described, an end point $E\alpha_1$ through $E\alpha_8$, $E\epsilon_1$ through $E\epsilon_8$ is also located on each starting point $S\alpha_1$ through $S\alpha_8$, $S\epsilon_1$ through $S\epsilon_8$. Thus, for example, point $E\alpha_2$ coincides with $S\epsilon_3$, as shown in FIG. 3.

The magnitudes of central angles $\epsilon_i$ of the second group thus derive from the respective length of the arc along which shaft 8 abuts on one of projections 5, 6 and inner radius Ri. Thus central angle $\epsilon_1$, for example, is defined by the circumferential length of centering flange 5.1 and inner radius Ri, $\epsilon_1$ being 2° in the present exemplary embodiment. For reasons of symmetry, central angles $\epsilon_2$, $\epsilon_5$, $\epsilon_6$ also have the value of 2°.

The same applies to the wider projections 6.1, larger central angles $\epsilon_3$, $\epsilon_4$, $\epsilon_7$, $\epsilon_8$ being provided at 12° respectively because, while inner radius Ri is identical, centering flanges 5.1 are longer.

Thus the sum of central angles $\epsilon_i$, which are respectively defined by starting points and end points $S\epsilon_i$, $E\epsilon_i$ of projections 5, 6, is 56°. On this basis, it is possible to determine the sum of central angles $\alpha_i$, which are respectively defined by starting points and end points $S\alpha_i$, $E\alpha_i$ on feather key grooves 3 or recesses 4. In the exemplary embodiment illustrated, feather key grooves 3 or recesses 4 are those regions along an inner circumferential line of body 1 that are not intended to contact shaft 8. The sum of central angles $\alpha_i$ is consequently 360°−56°=304°.

Individually, central angles $\alpha_1$ and $\alpha_5$ are each 8°, and central angles $\alpha_2$, $\alpha_3$, $\alpha_4$, $\alpha_6$, $\alpha_7$ and $\alpha_8$ are each 48°. The result is thus $\Sigma\epsilon_i$=56°<$\Sigma\alpha_i$=304°.

For a sufficiently high permissible rotational speed to be achievable for body 1, the geometry of body 1 is dimensioned accordingly. Particularly, the selection of the individual radii Ra, Rn, Ri, Ry and Rx is significant in this connection for optimizing the permissible rotational speed.

Example embodiments of the present invention may be provided in connection with comparatively slim annular bodies 1. For example, in the present exemplary embodiment, the ratio of Ra to Ri is approximately 1.34. The permissible maximum rotational speed may be increased if recesses 4 are produced on body 1, even though the radial extension of the annular body is reduced in comparison to conventional arrangements.

In the exemplary embodiment illustrated, additionally, at 29.3 mm, the distance Df between the bottom of feather key grooves 3 and axis Z is smaller than the radius Rn between the bottom of additional recesses 4 and axis Z, since Rn is, in this case, 30.1 mm. Consequently, feather key grooves 3 do not penetrate the annular region of body 1, which is bounded toward the interior by radius Rn. Accordingly, the mechanical stresses in the operation of body 1 progress very uniformly in a geometrical annular region that is bounded toward the interior by radius Rn such that the maximum amplitudes of stress peaks are minimized.

Feather key grooves 3 are bounded in the circumferential direction by parallel crosspieces and in the radial direction by the bottom of feather key grooves 3. The transition between the bottom of feather key grooves 3 to the crosspieces has a roughness $R_z$ of, e.g., 25 μm and a comparatively small contour radius Ry, which is 0.175 mm in the exemplary embodiment illustrated. For this reason, comparatively high stress peaks are to be expected there as a result of stress concentrations. So that a high permissible rotational speed is made possible nevertheless, the smallest contour radii Rx, those for the transition to radius Rn, which defines the bottom of recess 4, are comparatively large, e.g., 5 mm in this instance. This yields a ratio Rx/Ry of approximately 28.6.

Figure 5:
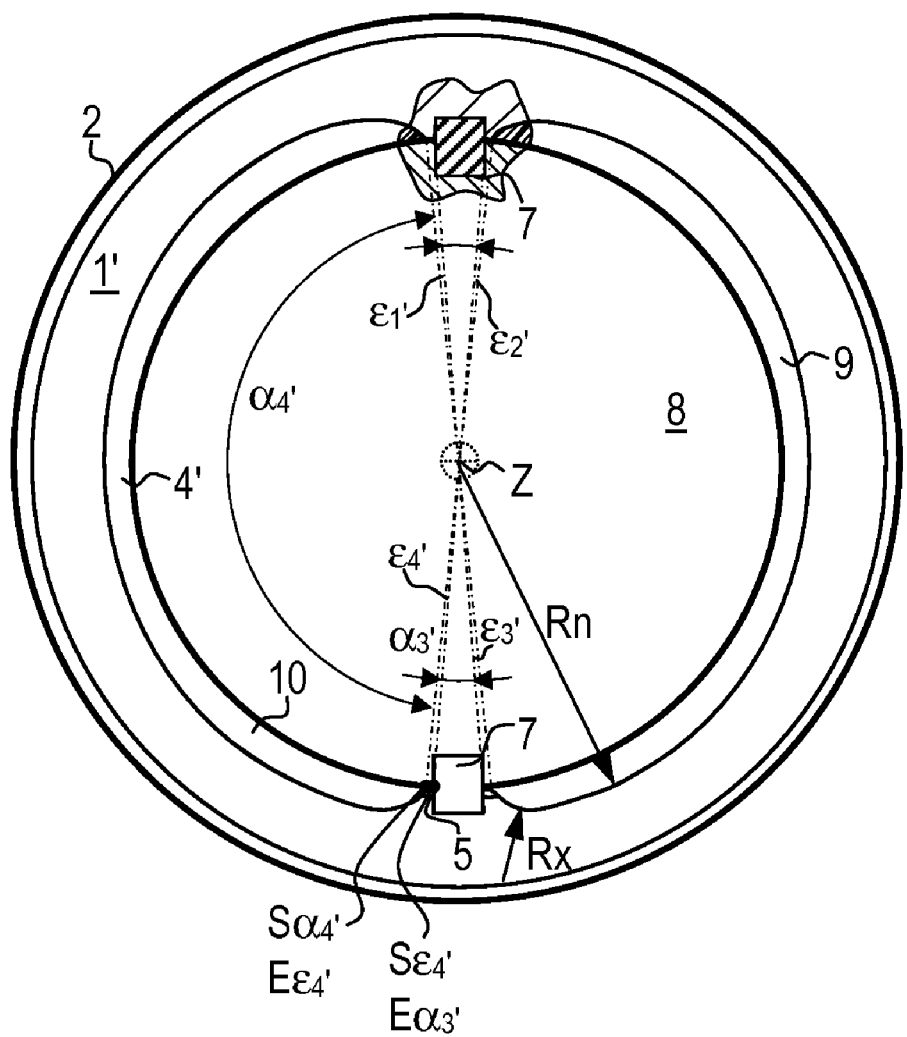
FIG. 5 is a top view of a body having the angle scale in the mounted state.

FIG. 5 shows a body 1' according to an example embodiment of the present invention. A difference with respect to the subject matter of the above-described exemplary embodiment is that only two recesses 4' are provided, which are comparatively long in the circumferential direction. In the exemplary embodiment illustrated, the two recesses 4' are respectively filled by a segment 9, which is fabricated, e.g., from plastic. Segments 9 contribute toward centering shaft 8 and may additionally provide a damping effect. On the other hand, practically no tangential stresses are transmitted through segment 9 into supporting body 1' such that there is a largely homogeneous progression of stress, particularly into that annular region of body 1' that is bounded inwardly by radius Ri.

The considerations regarding the central angles also apply to this exemplary embodiment. For example, the sum of central angles $\epsilon_i'$, which are respectively defined by starting points and end points $S\epsilon_1'$ through $S\epsilon_4'$, $E\epsilon_1'$ through $E\epsilon_4'$ of projections 5, is also smaller than the sum of central angles $\alpha_i'$, which are respectively defined by starting points and end points $S\alpha_1'$ through $S\alpha_4'$, $E\alpha_1'$ through $E\alpha_4'$ of feather key groove 3 and recesses 4. In the exemplary embodiment shown, the cumulative value ($\epsilon_1'+\epsilon_2'+\epsilon_3'+\epsilon_4'$) is quite smaller than ($\alpha_1'+\alpha_2'+\alpha_3'+\alpha_4'$) such that the condition $\Sigma\epsilon_i'<\Sigma\alpha_i'$ is satisfied.

Segments 9 may also be constructed as metal parts. In this case, the introduction of interfering tangential stresses through segments 9 into body 1' is prevented, particularly by an interstice between segments 9 and body 1'.

Body 1' may also have only one feather key groove 3 such that a segment 9 fills the single recess 4'.

What is claimed is:

1. An annular body, comprising:
    an angle scale adapted to measure a rotational position of a machine part about an axis; and
    radial recesses and projections provided on an inner circumference of the annular body, at least one of the recesses configured for a form-locking rotatably fixed attachment on the machine part;
    wherein a sum of first central angles respectively defined by starting points and end points of the projections is smaller than a sum of second central angles respectively defined by starting points and end points of the recesses.

2. The annular body according to claim 1, wherein the sum of the second central angles is greater than 240°.

3. The annular body according to claim 1, wherein the sum of the second central angles is greater than 300°.

4. The annular body according to claim 1, wherein the at least one recess configured for the form-locking rotatably fixed attachment on the machine part has a geometry having a smallest contour radius Ry and an additional recess has a smallest contour radius Rx with the condition Ry<Rx.

5. The annular body according to claim 1, wherein a smallest distance between a bottom of the recess configured for the form-locking rotatably fixed attachment on the machine part and the axis is less than or equal to a smallest distance between a bottom of another recess and the axis.

6. The annular body according to claim 1, wherein a ratio of an outer radius of the annular body to an inner radius of the annular body is less than 2.25.

7. The annular body according to claim 1, wherein a ratio of an outer radius of the annular body to an inner radius of the annular body is less than 1.75.

8. The annular body according to claim 1, wherein the angle scale is arranged on a lateral side of the annular body.

9. The annular body according to claim 1, wherein the angle scale is attached as a separate ring on the annular body.

10. The annular body according to claim 1, wherein the angle scale includes magnetic regions.

11. The annular body according to claim 1, wherein the recess configured for the form-locking rotatably fixed attachment on the machine part includes a feather key groove.

12. An annular body having an angle scale for measuring a rotational position of a machine part about an axis, comprising:
    radial recesses and projections provided on an inner circumference of the annular body, at least one of the recesses configured for a form-locking rotatably fixed attachment on the machine part;
    wherein a sum of central angles respectively defined by starting points and end points of the projections is smaller than a sum of central angles respectively defined by starting points and end points of the recesses.

13. A system, comprising:
a machine tool including a high-speed shaft; and
an annular body including:
   an angle scale adapted to measure a rotational position of the high-speed shaft about an axis; and
   radial recesses and projections provided on an inner circumference of the annular body, at least one of the recesses in form-locking rotatably fixed attachment on the high-speed shaft;
wherein a sum of first central angles respectively defined by starting points and end points of the projections is smaller than a sum of second central angles respectively defined by starting points and end points of the recesses.

14. The system according to claim 13, wherein the high-speed shaft is connectable to a cutting tool.

15. The system according to claim 13, further comprising a cutting tool connected to the high-speed shaft.

* * * * *